May 12, 1959 R. J. HORNE 2,886,350
CENTRIFUGAL SEALS
Filed April 22, 1957 2 Sheets-Sheet 1

INVENTOR
Robert Jackson Horne
BY
B. T. Wolgensmith
ATTORNEY

May 12, 1959 R. J. HORNE 2,886,350
CENTRIFUGAL SEALS

Filed April 22, 1957 2 Sheets-Sheet 2

INVENTOR
Robert Jackson Horne
BY
ATTORNEY

United States Patent Office 2,886,350
Patented May 12, 1959

2,886,350

CENTRIFUGAL SEALS

Robert Jackson Horne, Jenkintown, Pa.

Application April 22, 1957, Serial No. 654,346

6 Claims. (Cl. 286—9)

This invention relates to seals and more particularly to seals for use with rotary shafts of rotating hydrogen cooled electrical equipment, including horizontal or vertical water wheel operated generators, rotary converters, motor generators, and steam turbine generators, for valve stems of large high pressure steam valves, and steam control valves for turbines, and for other purposes.

Various seals have heretofore been proposed for equipment of the character referred to, but the seals now available have not proven wholly satisfactory because of high pressures and temperatures encountered, variations in pressures which occur, and other conditions.

Some of the seals heretofore proposed have been of very intricate construction and require finishing of the parts thereof to exceedingly close tolerances. Other seals heretofore proposed have required excessive pressures on the sealing elements with attendant high friction.

It is the principal object of the present invention to provide a seal in which a sealing liquid is employed and in which the liquid is centrifugally maintained in sealing position.

It is a further object of the present invention to provide a seal in which a sealing liquid is employed and which is effective with the shaft at rest as well as rotating.

It is a further object of the present invention to provide a seal in which a sealing liquid is employed with the liquid centrifugally maintained in sealing position, and which also includes structure for cooling the sealing liquid.

It is a further object of the present invention to provide a seal in which a sealing liquid is employed with the sealing liquid centrifugally maintained in sealing position and in which an indication of the condition of the seal is made available, and control mechanism is provided for the sealing structure for maintaining the seal.

Other objects and advantageous features of the invention will be apparent from the description and claims.

The nature and characteristic features of the invention will be more readily understood from the following description, taken in connection with the accompanying drawings forming part thereof, in which.

Figures 1, 3:
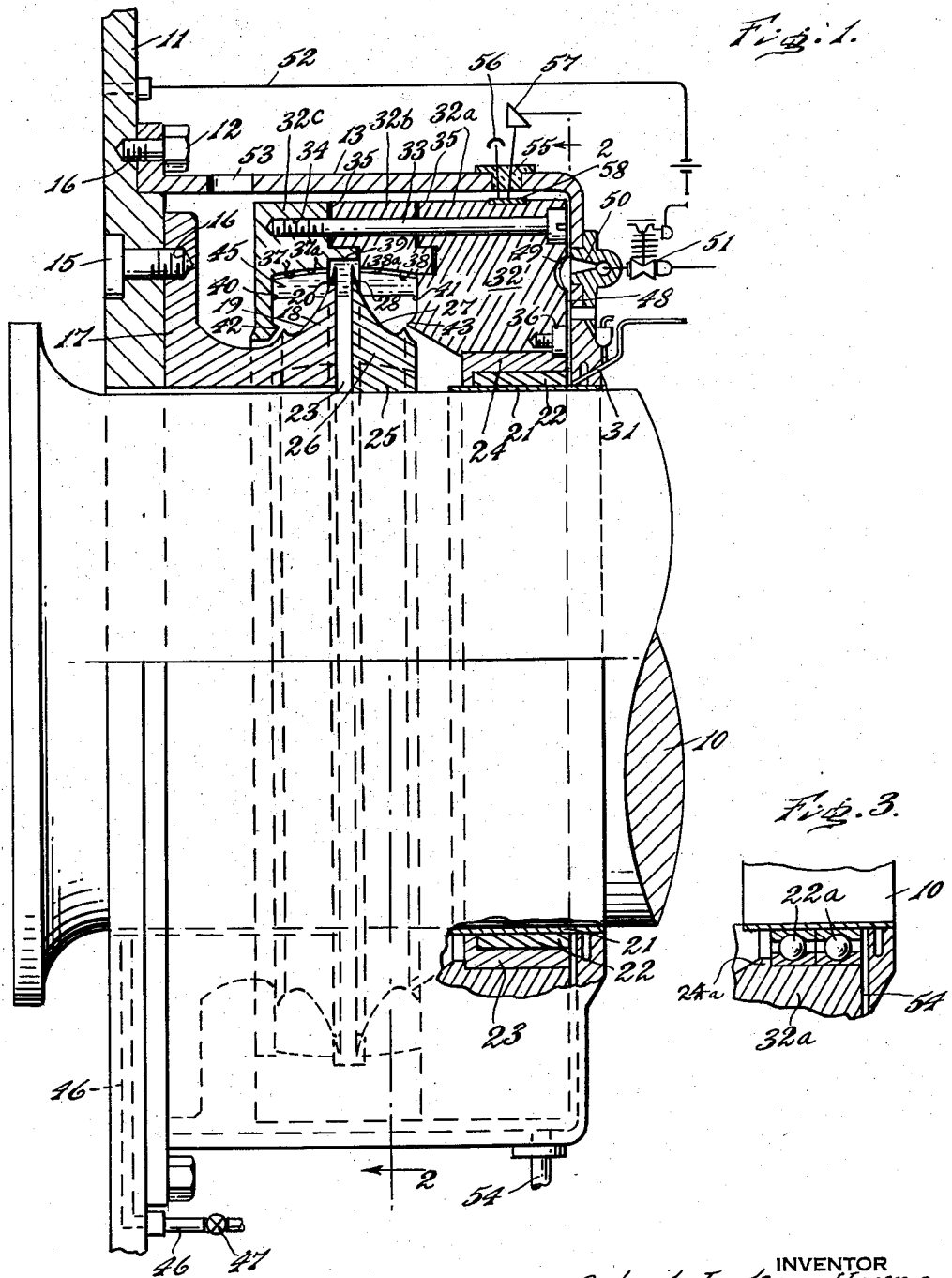
Figure 1 is a view partly in elevation and partly in section taken along the line of 1—1 of Fig. 2.
Fig. 3 is a fragmentary sectional view showing another form of bearing suitable for use with the invention.
Figure 2:
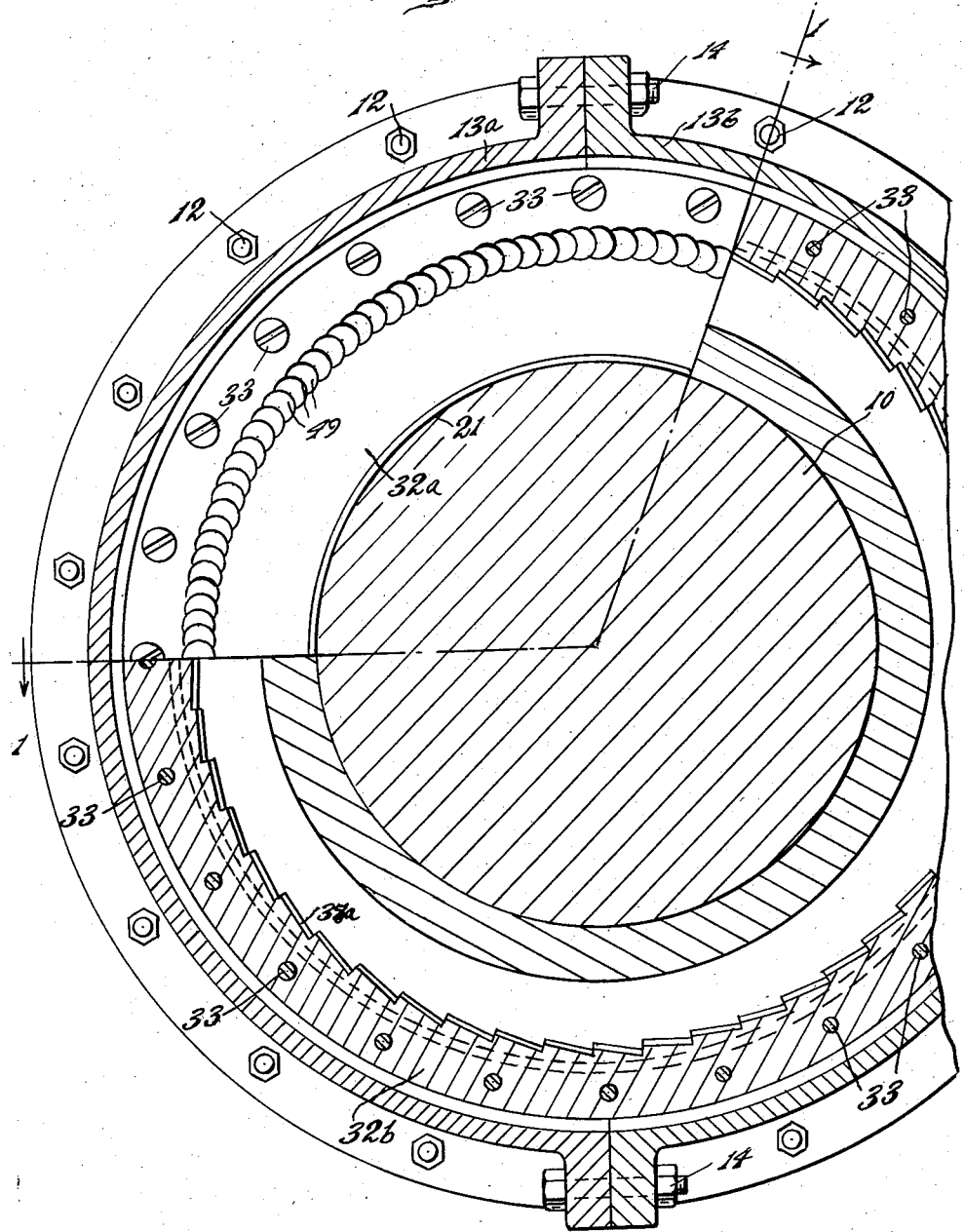
Fig. 2 is a vertical view taken along the line 2—2 of Fig. 1.

It should, of course, be understood that the description and drawings herein are illustrative merely, and that various modifications and changes can be made in the structure disclosed without departing from the spirit of the invention.

Like numerals refer to like parts through the several views.

Referring now more particularly to the drawings, a shaft 10 is shown of a machine or mechanism. The shaft 10 can be of the continuously rotating type, such as that of a steam, gas or hydraulic turbine, rotary converter, motor generator or the like, or of the intermittently moved type, such as that of a high pressure steam or other valve.

An enclosing casing 11 is provided, the mechanism therein (not shown) being hydrogen cooled, if desired. The casing 11 has the shaft 10 extending therefrom for driving or driven purposes, and for sealing.

The casing 10 has fixedly mounted thereon and held in any desired manner, such as by bolts 12, an end casing 13. The end casing 13 can have separable sections 13a and 13b held in assembled relation by bolts 14.

The casing 11 has secured thereto by studs 15 in blind holes 16, a sealing stator 17 which has a baffle portion 18 with a curved peripheral surface 19 terminating in a knife edge portion 20. The knife edge portion 20 can be of any desired material, and where high temperatures and pressures are involved can be of Stellite.

Axially spaced from the sealing stator 17, and secured to the shaft 10 in any desired matter such as by a shrink fit, and for rotation within the shaft 10, an inner sealing rotor 25 is provided which has a baffle portion 26 with a curved peripheral surface 27 terminating in a knife edge portion 28. The knife edge portion 28 can be of any desired material, and where high temperatures and pressures are involved, can be of Stellite.

The space 23 between the sealing stator 17 and the inner sealing rotor 25 is in communication with the interior of the casing 11 and the fluid and the pressure thereof effective therein are those desired to be retained, sealed and prevented from escaping to the interior of the end casing 13 or to the atmosphere.

Axially spaced from the sealing rotor 25, and mounted on the shaft 10, a bearing 22 is provided which can have an inner sleeve 21 shrunk on the shaft 10 and with a bearing sleeve 22 rotatable thereon, as shown in Fig. 1, or can be a ball bearing 22a, as shown in Fig. 3. A retainer ring 24 can be provided for the bearing 22 or a retainer flange 24a can be provided for the bearing 22a.

A port 31 for the supply of lubricant and extending to the bearing 22 can be provided in the end casing 13.

The bearing 22 or 22a has supported thereon, for rotation about the longitudinal axis of the shaft 10, an outer sealing rotor 32, which is preferably made of a plurality of sections 32a, 32b and 32c, secured together with bolts 33 extending into blind holes 34, and with interposed sealing gaskets 35.

The retainer ring 24 can be held in position in the section 32a by bolts 36.

The sections 32b and 32c are provided on the interior thereof with curved surfaces 37 and 38 with serrations 37a and 38a, having a groove 39 interposed therebetween to provide a trough into which the knife edge portions 20 and 28 project.

The knife edge portions 20 and 28 extend close to but do not touch the radially outermost part of the surface of the groove 39. Extending inwardly from the surfaces 37 and 38, side walls 40 and 41 are provided with inwardly extending rims 42 and 43 with their interior surfaces projecting towards the surfaces 19 and 27.

Within the interior space thus provided between the outer sealing rotor 32 and the sealing stator 17 and inner sealing rotor 25, a suitable quantity of sealing liquid 45 is provided. The liquid can be of the desired type, dependent upon the particular requirement for sealing, mercury being suitable for some purposes, water for others, or for still other purposes ethylene glycol is suitable.

The casing 11 can be provided with a fluid connection 46 controlled by a valve 47 for recovery of the sealing liquid 45.

On the radial face 48 of the rotor section 32a, a plurality of circularly arranged vanes 49 are provided.

The end casing 13 has a nozzle portion 50 thereon for delivery of propelling fluid against the vanes 49. The propelling fluid can be any desired liquid or gas, although it is preferred to utilize cool filtered dry air from the plant compressors (not shown) and controlled by a valve 51. The valve 51 can be a diaphragm valve controlled in any desired manner, such as by the internal pressure within the casing 11 applied thereon through a pressure tap 52.

The propelling fluid, circulating around the exterior of the sealing rotor, can also be utilized for cooling and can be discharged through a vent opening 53 in the end casing 13. Additionally, a separate source of cooling air can be provided and connected by a pipe 54 to the end casing 13 remote from the opening 52, for circulation along the outer end of the bearing 22 or 22a and over the exterior of the sealing rotor 32.

If it is desired to check on the speed of rotation of the sealing rotor 32, this can be readily effected by providing a stroboscope either of the local or remote reading type, with components utilizing a transparent but closed plug 55 in the end casing 13, and including an alternating current light source 56 externally disposed and delivering a beam of light through the plug 55 onto a portion of the periphery of the sealing rotor 32 and a pick-up prism 57, also externally disposed. A calibrated ring 58 can be provided on the rotor 32.

The mode of operation will now be pointed out.

Propelling fluid, preferably an inert gas under pressure, applied through the nozzle portion 50 and against the vanes 49 is effective for rotating the sealing rotor 32 at the desired speed of rotation and in the desired direction. It is preferred that the direction of rotation be the same as that of the shaft 10 and at the same speed to minimize or reduce friction losses. It will be noted, however, that the sealing rotor 32 can be actuated with the shaft 10 in any desired arrangement, i.e., horizontal, vertical, or inclined, and when starting up, or running, so that the shaft sealing can be continuously maintained at all times and under varying conditions.

The rotation of the sealing rotor 32 with its serrations 37a—38a causes the sealing liquid 45 to be centrifugally impelled outwardly and thus disposed and maintained in the groove 39 and radially inwardly therefrom with the knife edge portions 20 and 28 immersed therein.

The force stored in the sealing liquid 45 is dependent upon the speed of rotation of the sealing rotor 32 and the density of the sealing liquid 45, and provides a hydraulic head in opposition to the difference in pressure between that prevailing in the interior of the end casing 13. The preponderance of this hydraulic head provides an effective seal.

The sealing rotor 32 is cooled, with attendant cooling of the sealing liquid 45 by the propelling fluid supplied through the nozzle portion 50 and the cooling fluid connection 54. The propelling fluid and the cooling fluid by their contact with the sealing rotor 32 absorb heat therefrom and exhaust through the vent opening 53.

I claim:

1. A seal for shafts comprising a shaft, a fixedly mounted casing through which the shaft to be sealed extends, a casing section connected to said casing and extending along said shaft exteriorly of said casing, a fixedly mounted sealing member carried by said casing and surrounding said shaft within said casing section, a rotatable sealing member secured to said shaft within said casing section in spaced relation thereto and mounted longitudinally axially on said shaft in spaced relation to said first mentioned sealing member, each of said sealing members having an outwardly circumferentially extending edge and a side wall portion with an outturned flange, a second rotatable sealing member disposed within said casing section and rotatably mounted with respect to said casing, said second rotatable sealing member having a portion surrounding said outwardly extending edges and being provided with an annular chamber into which said outwardly extending edges extend, said second rotatable member having inturned flanges providing with said side wall portions and said outturned flanges a retaining chamber with which said annular chamber is in communication, a body of sealing liquid in said chambers and centrifugally annularly disposed therein into which said edges extend, and impelling members for effecting rotation of said second rotatable member independently of the rotation of said shaft.

2. A seal for shafts as defined in claim 1 in which said annular chamber is provided with a plurality of serrations.

3. A seal for shafts as defined in claim 1 in which said second rotatable sealing member comprises a plurality of separable sections, one of which is provided with one of the inturned flanges, and another of which is provided with the other of the inturned flanges.

4. A seal for shafts as defined in claim 1 in which said second rotatable sealing member comprises a plurality of separable sections having interior portions bounding said annular chamber.

5. A seal for shafts as defined in claim 1 in which said casing section has a cooling fluid connection for delivery of cooling fluid over the exterior of said second rotatable sealing member and said casing section in spaced relation to said cooling fluid connection has a cooling fluid discharge connection.

6. A seal for shafts as defined in claim 1 in which said impelling members include impelling vanes on an exterior face of said second rotatable member and impelling fluid discharging members carried by said casing for discharge of impelling fluid against said vanes.

References Cited in the file of this patent

UNITED STATES PATENTS

| | | |
|---|---|---|
| 876,613 | Wilkinson | Jan. 14, 1908 |
| 2,133,879 | Thearle | Oct. 18, 1938 |
| 2,284,465 | Wood | May 26, 1942 |